June 16, 1931.   C. L. HARKRADER   1,810,397
LIFE FLOAT
Filed May 10, 1930   2 Sheets-Sheet 2
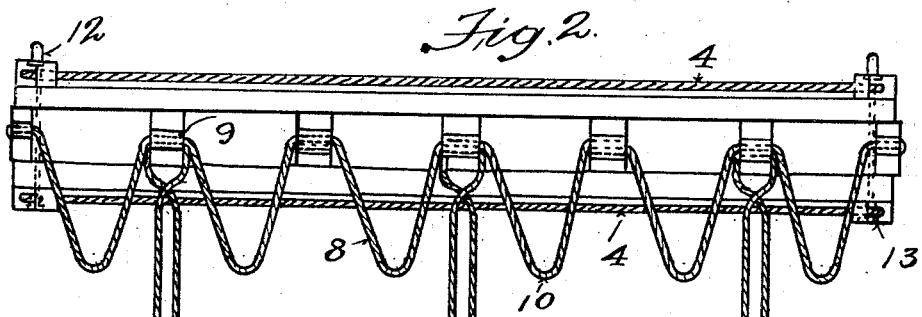
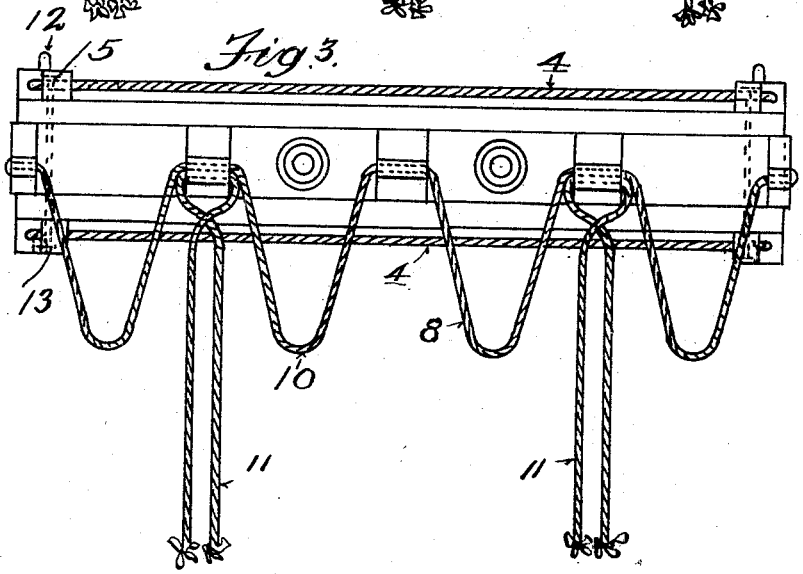
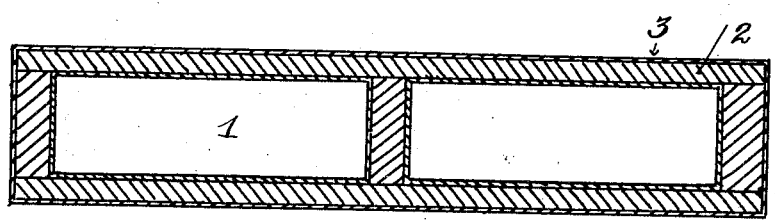
Carl L. Harkrader, Inventor
By his Attorneys
Darby & Darby Patented June 16, 1931

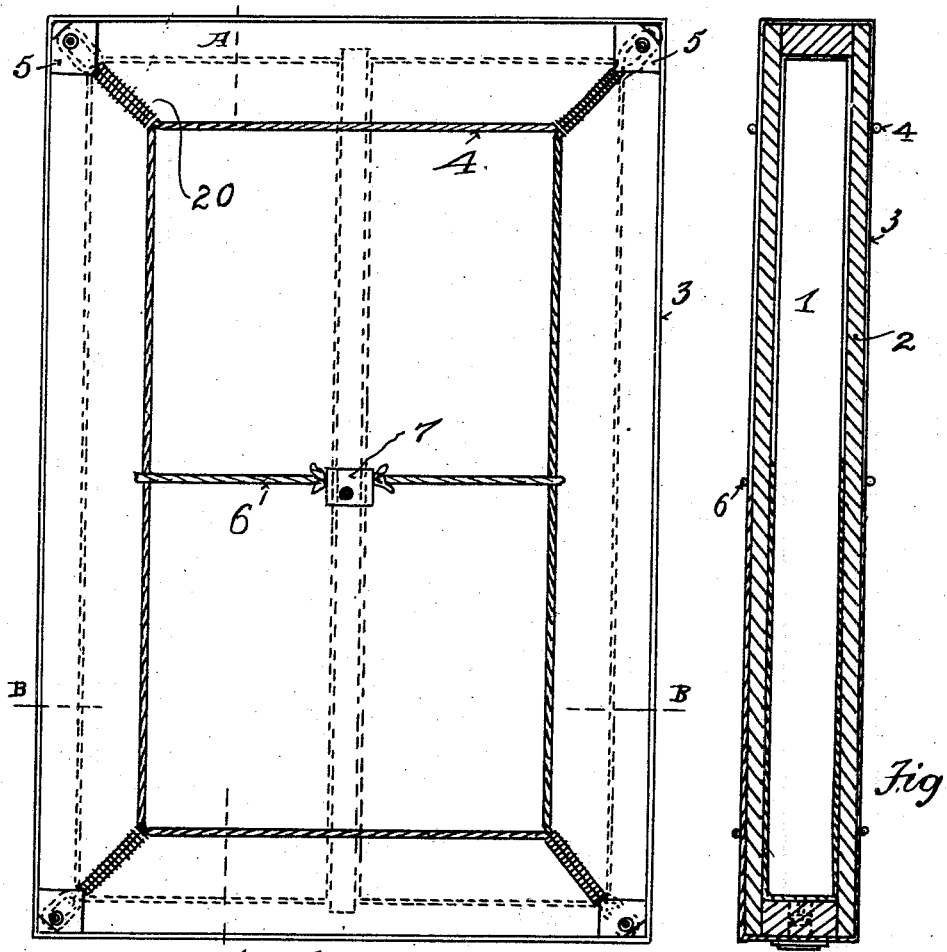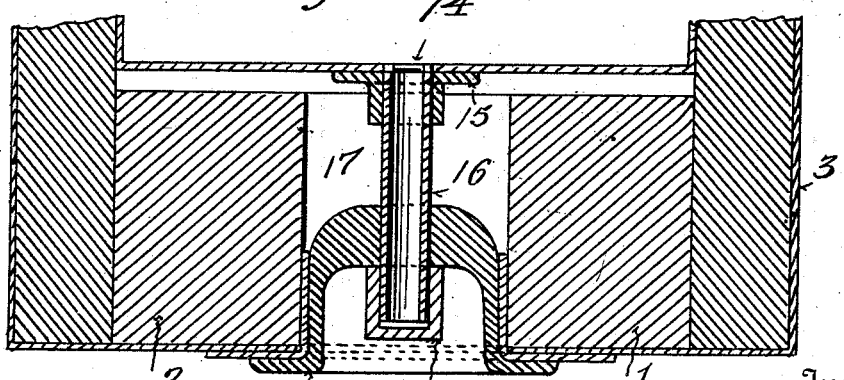

1,810,397

UNITED STATES PATENT OFFICE

CARL L. HARKRADER, OF EAST ORANGE, NEW JERSEY, ASSIGNOR TO WELIN DAVIT & BOAT CORPORATION, OF LONG ISLAND CITY, NEW YORK, A CORPORATION OF NEW YORK

LIFE FLOAT

Application filed May 10, 1930. Serial No. 451,277.

A life float, in the parlance of the sea, is a buoyant device which may be thrown overboard from a ship in case of shipwreck or other need, and to which persons in the water may cling as distinguished from a life raft which is intended primarily to support persons upon its surface entirely clear of the water.

The primary object of my invention is the provision of a life float of extreme buoyancy in proportion to its size, which will support the maximum number of persons able to cling to it and which in addition embodies to a limited degree the characteristics of a life raft as well as for those who through exhaustion or injury must not be allowed to remain in the water.

My invention also provides improved means whereby those clinging to the float may lash themselves or be lashed to it, means whereby the air compartments may be easily and quickly tested, and means whereby when the floats are piled one upon another they lock themselves together so that they will not slip, and yet may be removed from the pile simply by raising each float a little from the one beneath.

A further advantage of my invention is found in the complete protection given the air chambers by an external layer of balsa wood, which also serves as a highly buoyant member, and as a highly efficient bumper.

A form of my invention which I have selected solely for purposes of illustration is shown in the accompanying drawings; of which Figure 1 is a plan view of a life float embodying my invention;

Figs. 2 and 3 are side and end elevations, respectively, of the float illustrating in particular a desirable form of rigging therefor;

Fig. 4 is a longitudinal cross-section of the float on the line A—A of Fig. 1;

Fig. 5 is a transverse cross-section along the line B—B of Fig. 1;

Fig. 6 is a detailed drawing illustrative of a means whereby the tightness of the air tanks may be tested.

As will be seen from these drawings, my life float consists of a multiplicity of air tanks 1 preferably made of a metal which is resistant to the corrosive action of salt water, surrounded on all sides by a layer of balsa wood which, as is well known, is extremely light and buoyant. The raft which I have chosen for illustrative purposes is equipped with two of the air tanks 1 referred to, placed side-by-side, as shown in Fig. 5 and each running the entire length of the raft (see Fig. 4). Each of the tanks is entirely surrounded by a layer of balsa wood 2, not only on the outer sides and ends, but between the two tanks and on the top and bottom as well. In view of the fact that balsa wood is employed not only for its buoyancy, but to act as a fender to protect the air tanks from injury through impact with rocks or the sides of the ship and the like, it is preferably made thicker on the sides and ends than on the top and bottom. For example, the sides and end layers as shown may be 2½ inches in thickness, whereas the top and bottom layers need be only one inch thick. This is, of course, a matter of detail which may be varied to suit the desires of the builder, but I have found that the thickness indicated when employed on a 6 x 4 foot float supplies far more buoyancy and protection than is now required by the present laws of the United States relating to life saving equipment and complies in all respects with the recommendations of the International Conference for Safety at Sea held in London in 1929. The invention of this float was undertaken not simply to meet the provisions of present laws, but to provide the greatest possible amount of safety consistent with practical considerations as outlined by the recommendations of the conference referred to.

Furthermore, the additional thickness of balsa wood at the sides and ends makes it possible to fasten the several parts of the raft together securely. For this purpose I prefer to employ birch pins, but any other satisfactory methods may, of course, be employed.

The balsa wood employed is preferably treated for waterproofing and against rotting by any well-known process prior to the construction of the float. I then, also, prefer to give it one or more coats of heavy paint, after which it is covered with canvas 3, and the canvas then sized and shrunk and given another coat of heavy paint. The canvas covers the entire float so that I have first metallic air tanks 1 for buoyancy, outer layers of treated balsa wood 2 for buoyancy and protection and an external cover of canvas 3 which has been shrunk and painted as described for still further waterproofing and protection of the entire float against damage and deterioration.

I also preferably equip my float with the following rigging to enable persons to cling to my float:—On the top and bottom surface I provide a life line 4 fastened at each corner of the float by a wooden block bolted through the balsa wood as at 5 and running around all four sides of the float. The blocks 5 are positioned at the extreme corners of the float so that the bolts may be run through the thickest part of the balsa wood. However, I prefer to position these life lines several inches in from the edges of the float and yet parallel to the edges. This may be done by wiping together the parts of the life line on either side of each corner until it is taut and in the desired positon. This is clearly shown at 20 in Fig. 1.

Other means of positioning and adjusting this life line may, of course, be substituted, but I find that this method results in a strong construction since the line is fastened to the balsa wood where the wood is thickest. In order to further insure that life line will be retained in position, the middle of each side and, if desired, of each end may be fastened together by additional lines 6 secured to a block and bolt 7 running through the strip of balsa wood which separates the two air tanks. As I have already indicated, each surface of the float is provided with a life line of this kind.

An additional life line is provided around the edges of the float as best shown in Figs. 2 and 3. This is also in the form of a line 8 running entirely around the float midway between the top and bottom surfaces and fastened thereto by canvas straps 9 sewn to the canvas cover of the float or by any other suitable means. This line is preferably formed into loops 10 between the points at which it is fastened to the float. These loops will float in the water and may be readily grasped.

It frequently happens that shipwrecked persons become so exhausted and numbed that they are unable to cling to a float. I, therefore, provide means by which they may either lash themselves or be lashed thereto. In the drawings I show this means in the form of other ropes 11 fastened at intervals to the edges of the float in any suitable way, such for example, by the canvas straps 9 already referred to. These ropes, instead of being in the form of loops, have loose ends which may be wrapped around the body and tied.

It is customary for ships to carry a number of life floats on their decks stacked in piles. This may readily be done with my float, in spite of the rigging on the top and bottom thereof, because of the wooden corner blocks which will separate the surfaces of the float sufficiently to permit of solid stacking. In order that such stacks of floats may be kept from slipping, each of the blocks upon one side of my float may be equipped with a pin 12, and each of the blocks on the other side of the float with a depression 13 of such size that when one float is placed upon another the points on one float will fit into the depressions on the float above, thus locking them securely together and yet permitting of removal simply by lifting the top float off the pile.

It will be noted that by the above construction, I provide not only a life float to which persons may cling, but also one having a solid upper surface upon which injured or completely exhausted persons may be placed if necessary. Since the float is not intended to be a raft primarily, the number of persons who may ride thereon is limited, but the possibility that a few may find this added safety is obviously very desirable and constitutes a decided improvement over life floats in which no such provision is made.

In view of the fact that the air tanks are inaccessible, it is very desirable to provide means whereby their tightness may be tested from time to time. I provide means for this purpose as follows:—In one end of each air tank I provide a hole 14 surrounded by a threaded collar 15 brazed, welded or otherwise securely fastened to the metallic tank. A pipe 16 is threaded in the collar 14 and projects outwardly through a corresponding but larger hole 17 in the balsa. The outer end of the hole in the balsa is surrounded by a flanged ferrule 18 made water tight with the exterior canvas cover of the float, which affords protection for the edges of the hole through the balsa wood and also supports the outer end of pipe 16 which projects a few inches of the bottom of the ferrule 18 as shown in Fig. 6. The outer end of pipe 16 is threaded and upon it a threaded cap 19 is screwed to make a water and air tight joint. It will be noted that the cap 19 when screwed down is entirely below the surface of the float inside of the ferrule 18 and is thus fully protected against injury. Whenever it is desired to test the air tanks, it is simply necessary to remove cap 19 and attach to the outer end of pipe 16 any suitable form of testing apparatus.

The air tanks 1 it will be noted are not fastened to the balsa wood, but simply rest within the cavities formed by the balsa wood construction. Preferably the fit between the tanks and the balsa wood is made rather loose, since by this simple means the tanks are wholly safeguarded from any strain which might be imposed upon them through the warping of the float in a heavy sea.

I claim:

1. A life float comprising a buoyant body enclosed within a casing of balsa wood to form a raft-like structure with flat top and bottom surfaces, said top and bottom surfaces being equipped with life lines fastened at the corners of said balsa wood casing, and means whereby the life lines may be made taut and positioned a few inches within the edges of the float and parallel to said edges.

2. A life float comprising a buoyant body enclosed within a casing of balsa wood, and means whereby access may be had to the interior of the buoyant body for testing the air tightness thereof, the external end of said means being depressed below the surface of the balsa wood casing.

3. A life float consisting of a casing of balsa wood forming a raft like structure with flat top and bottom surfaces and enclosing a metallic airtight buoyant member, blocks at the corners of said casing upon both top and bottom surfaces, pins projecting upwardly from the upper blocks and corresponding recesses in the lower blocks.

4. A life float consisting of a casing of balsa wood forming a raft like structure with flat top and bottom surfaces and enclosing a metallic airtight buoyant member, blocks at the corners of said casing upon both top and bottom surfaces, the outer surfaces of said blocks lying in a plane external of the plane of all other parts of the float associated with the top and bottom surfaces, and pins projecting upwardly from the upper blocks and corresponding recesses in the lower blocks.

5. A life float consisting of a casing of balsa wood forming a raft like structure with flat top and bottom surfaces and enclosing a metallic airtight buoyant member, blocks at the corners of said casing upon both top and bottom surfaces, the outer surfaces of said blocks lying in a plane external of the plane of all other parts of the float associated with the top and bottom surfaces, pins projecting upwardly from the upper blocks and corresponding recesses in the lower blocks, means communicating with the interior of the buoyant body for testing the airtightness of said body, the external end of said means being recessed within and below the surface of the balsa wood casing.

In testimony whereof I have hereunto set my hand on this 5th day of May A. D. 1930.

CARL L. HARKRADER.